(12) United States Patent
Jung et al.

(10) Patent No.: US 9,137,697 B2
(45) Date of Patent: Sep. 15, 2015

(54) METHOD AND APPARATUS FOR PERFORMING LOGGED MEASUREMENT IN A WIRELESS COMMUNICATION SYSTEM

(75) Inventors: Sung Hoon Jung, Anyang-si (KR); Seung June Yi, Anyang-si (KR); Young Dae Lee, Anyang-si (KR); Sung Duck Chun, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 297 days.

(21) Appl. No.: 13/634,497

(22) PCT Filed: Mar. 24, 2011

(86) PCT No.: PCT/KR2011/002042
§ 371 (c)(1),
(2), (4) Date: Sep. 12, 2012

(87) PCT Pub. No.: WO2011/118998
PCT Pub. Date: Sep. 29, 2011

(65) Prior Publication Data
US 2013/0010631 A1    Jan. 10, 2013

Related U.S. Application Data

(60) Provisional application No. 61/317,250, filed on Mar. 24, 2010.

(51) Int. Cl.
| | | |
|---|---|---|
| *H04L 1/00* | (2006.01) | |
| *H04W 24/10* | (2009.01) | |
| *H04W 24/02* | (2009.01) | |
| *H04W 16/18* | (2009.01) | |
| *H04W 64/00* | (2009.01) | |

(52) U.S. Cl.
CPC ............. *H04W 24/10* (2013.01); *H04W 16/18* (2013.01); *H04W 24/02* (2013.01); *H04W 64/00* (2013.01)

(58) Field of Classification Search
CPC ..... H04W 24/00; H04W 24/02; H04W 24/04; H04W 24/08; H04W 24/10; H04W 16/18; H04W 64/00
USPC .............. 370/252, 329, 331, 332; 455/67.11, 455/423, 456.1; 709/224
See application file for complete search history.

(56) References Cited

U.S. PATENT DOCUMENTS

2006/0128371 A1*  6/2006  Dillon et al. ................... 455/423
2011/0201279 A1*  8/2011  Suzuki et al. ............... 455/67.11
2012/0311147 A1* 12/2012  Keskitalo ...................... 709/224

OTHER PUBLICATIONS

Ericsson, "Logged MDT Measurement Reporting", R2-101425, 3GPP TSG-RAN WG2 #69, Feb. 2010.
Samsung, "MDT configuration for logging in idle mode", R2-101141, 3GPP TSG RAN WG2 #69, Feb. 2010.
Qualcomm Europe, "MDT Reporting triggers", R2-101518, 3GPP TSG-RAN WG2 meeting #69, Feb. 2010.
Vodafone, "Mechanisms for Delayed Reporting in Connected Mode", R2-101297, 3GPP TSG RAN WG2 #69, Feb. 2010.

* cited by examiner

*Primary Examiner* — Candal Elpenord
*Assistant Examiner* — Harun Chowdhury
(74) *Attorney, Agent, or Firm* — Lee, Hong, Degerman, Kang & Waimey

(57) ABSTRACT

Provided are a method and apparatus for performing logged measurement in a wireless communication system. A terminal receives measurement setup and a terminal selection parameter from a base station. The terminal determines whether to apply the measurement setup on the basis of the terminal selection parameter. If it is determined that the measurement setup is to be applied, the terminal performs measurement logging on the basis of the measurement setup.

4 Claims, 16 Drawing Sheets

METHOD AND APPARATUS FOR PERFORMING LOGGED MEASUREMENT IN A WIRELESS COMMUNICATION SYSTEM

CROSS-REFERENCE TO RELATED APPLICATIONS

This application is the National Stage filing under 35 U.S.C. 371 of International Application No. PCT/KR2011/002042, filed on Mar. 24, 2011, which claims the benefit of U.S. Provisional Application Ser. No. 61/317,250, filed on Mar. 24, 2010, the contents of which are all hereby incorporated by reference herein in their entirety.

TECHNICAL FIELD

The present invention relates to wireless communication and, more specifically, to a method and apparatus for performing logged measurement in a wireless communication system.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The Minimization of Driving Tests (MDT) is a test in which service providers perform tests for coverage optimization using terminals instead of using vehicles. Coverage is changed depending on the position of a base station, the deployment of surrounding buildings, and use environments of users. Accordingly, a service provider needs to perform a driving test periodically, and thus lots of costs and resources are consumed. The MDT is a test in which a service provider measures coverage using terminals.

The MDT may be divided into a logged MDT and an immediate MDT. In accordance with the logged MDT, a terminal performs MDT measurement and then transfers logged measurement to a network at a specific point of time. In accordance with the immediate MDT, a terminal performs MDT measurement and transfers the measurement to a network when a report condition is satisfied. In the logged MDT, MDT measurement is performed in RRC idle mode, but in the immediate MDT, MDT measurement is performed in RRC connected mode.

As measurement in various RRC modes, such as MDT, appears, it is necessary to configure a measurement configuration more flexibly.

DISCLOSURE

Technical Problem

The present invention provides a method and apparatus for performing logged measurement in a wireless communication system.

The present invention also provides a method and apparatus for indicating RRC mode to which an RRC configuration is applied in a wireless communication system.

Technical Solution

In an aspect, a method of performing logged measurement, performed by a user equipment (UE), in a wireless communication system is provided. The method includes: receiving a measurement configuration from a Base Station (BS); receiving a UE selection parameter from the BS; determining whether or not to apply the measurement configuration based on the UE selection parameter; and logging measurement based on the measurement configuration if it is determined to apply the measurement configuration.

The UE may operatee in Radio Resource Control (RRC) idle mode.

The measurement configuration may be a Minimization of Driving Tests (MDT) configuration for MDT measurement.

The UE selection parameter may include an identifier of the UE or an identifier of a UE group to which the measurement configuration will be applied.

In another aspect, an apparatus for performing logged measurement in a wireless communication system is provided. The apparatus includes a Radio Frequency (RF) unit that transmits and receives radio signals; and a processor connected to the RF unit. The processor is configured to: receive a measurement configuration from a Base Station (BS); receive a UE selection parameter from the BS; determine whether or not to apply the measurement configuration based on the UE selection parameter; and log measurement based on the measurement configuration if it is determined to apply the measurement configuration.

In still another aspect, a method of performing measurement in a wireless communication system is provided. The method includes: receiving, by a user equipment (UE), a measurement configuration from a Base Station (BS); receiving, by the UE, a Radio Resource Control (RRC) mode indicator, indicating RRC mode to which the measurement configuration is applied, from the BS; and performing, by the UE, measurement using the measurement configuration in RRC mode indicated by the RRC mode indicator.

Advantageous Effects

A network may instruct a certain number of UEs within each cell to perform the execution of measurement and a report which are necessary for a specific number of UEs statistically. Whether UE performs the execution of measurement and a report or not is performed according to a statistics or probability method. Thus, the case where a specific UE performs measurement repeatedly can be prevented.

If the proposed method is applied to the measurement configuration of UE, a network may designate whether UE has to measure what frequency in RRC idle mode particularly by using the structure of a measurement configuration that is used in RRC connected mode. Additional measurement configuration signaling for changing a measurement configuration in RRC idle mode in relation to UE can be reduced, and a smooth measurement configuration in RRC connected mode can also be applied to RRC idle mode.

MODE FOR INVENTION

Figure 1:
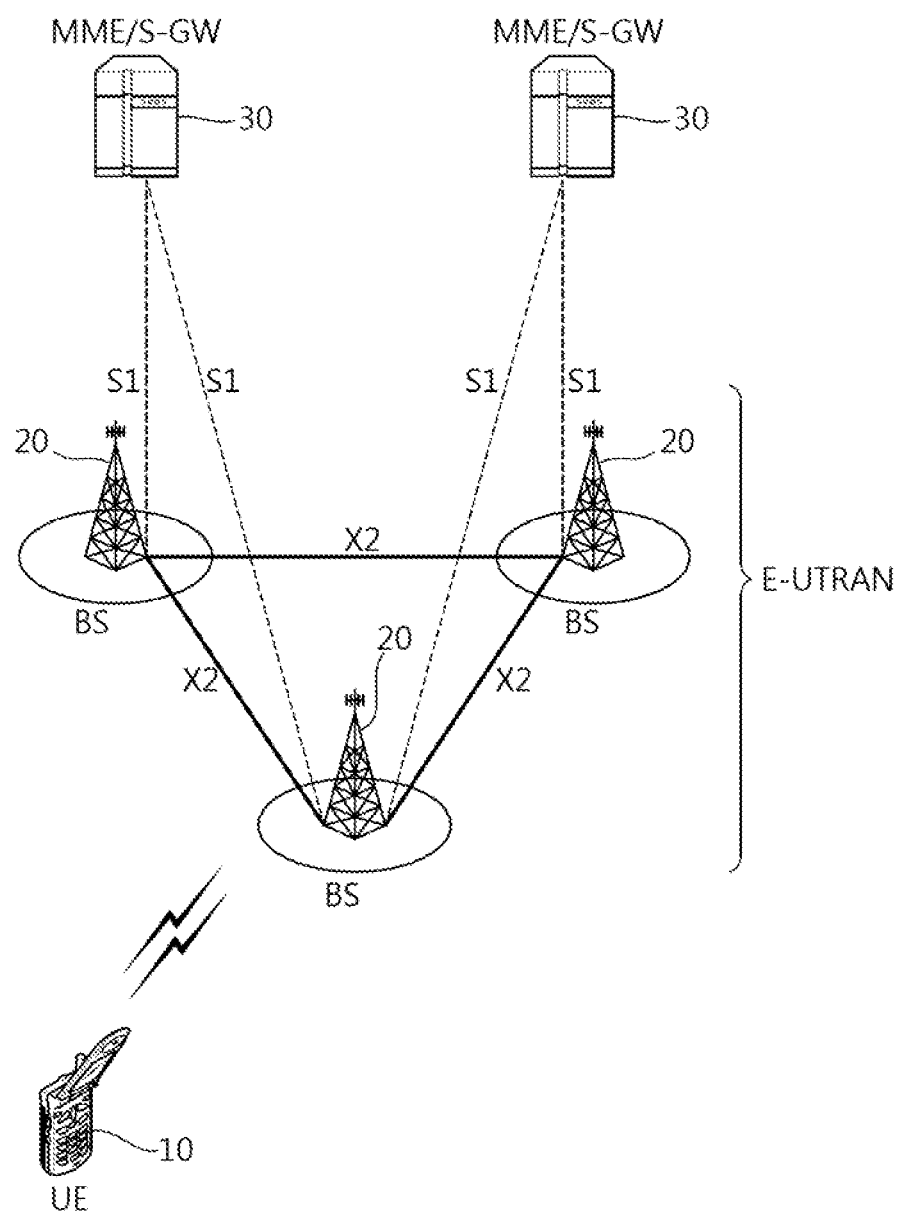
FIG. 1 illustrates a wireless communication system to which the present invention is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
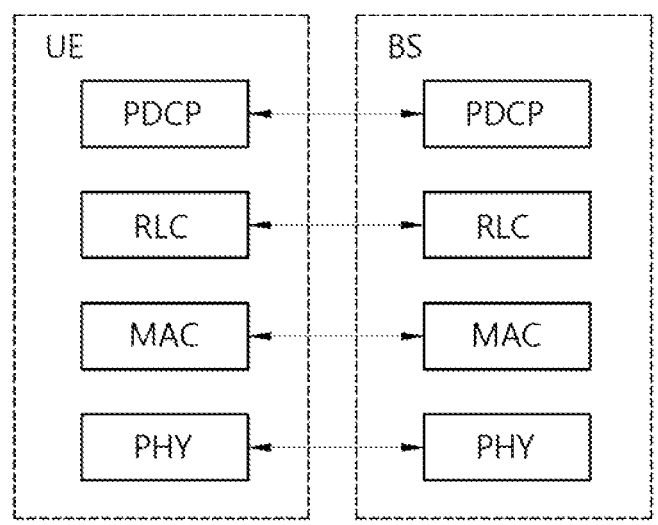
FIG. 2 is a diagram illustrating a radio protocol architecture for a user plane.
Figure 3:
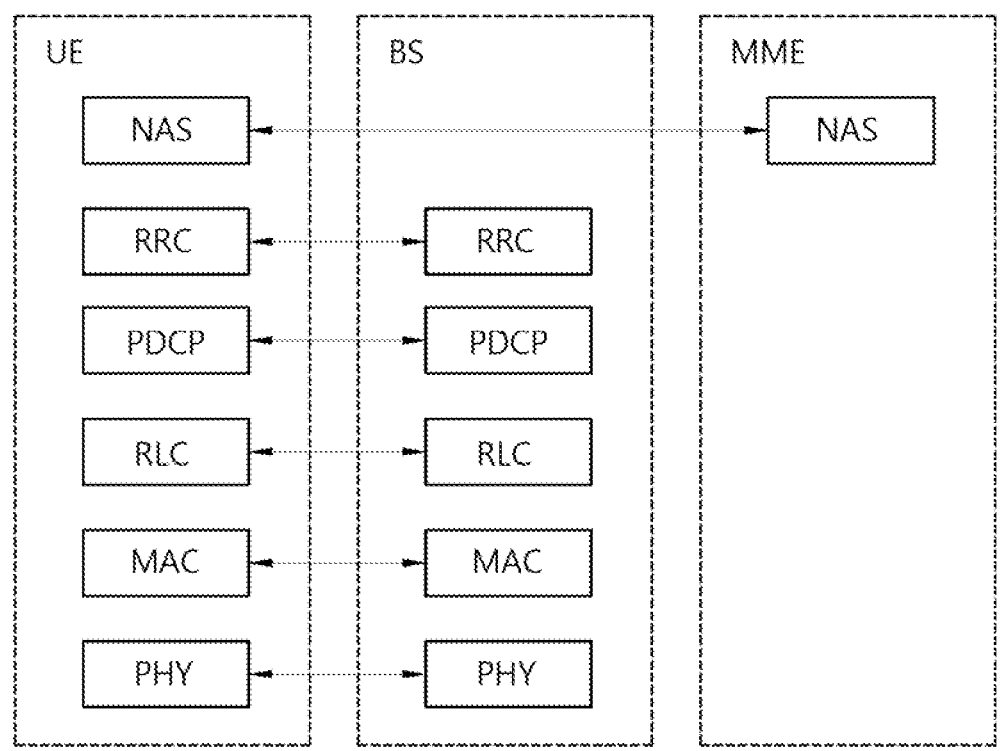
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) "User Equipment (UE) procedures in idle mode (Release 8)", a method and procedure for selecting a cell by a UE in 3GPP LTE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 below.

$$Rs = Q\text{meas},s + Q\text{hyst}, Rn = Q\text{meas},n - Q\text{offset} \quad \text{[Equation 1]}$$

Herein, Rs denotes a ranking value of a serving cell, Rn denotes a ranking criterion of a neighboring cell, Qmeas,s denotes a quality value measured for the serving cell by the UE, Qmeas,n denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qffoset=Qoffsets,n. Otherwise, Qffoset=0.

In the inter-frequency cell reselection, if the UE receives the offset Qoffsets, n, Qoffset=Qoffsets,n+Qfrequency. Otherwise, Qoffset=Qfrequency.

If the ranking criterion Rs of the serving cell and the ranking criterion Rn of the neighboring cell are not much different from each other and constantly vary, ranking orders of the serving cell and the neighboring cell may change frequently. Thus, the serving cell and the neighboring cell may be reselected alternately while changing their ranking orders frequently. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as a most important factor when performing the cell reselection. If a reselected cell is not a suitable cell, the UE excludes the reselected cell or a frequency of the reselected cell from targets of the cell reselection.

Figure 4:
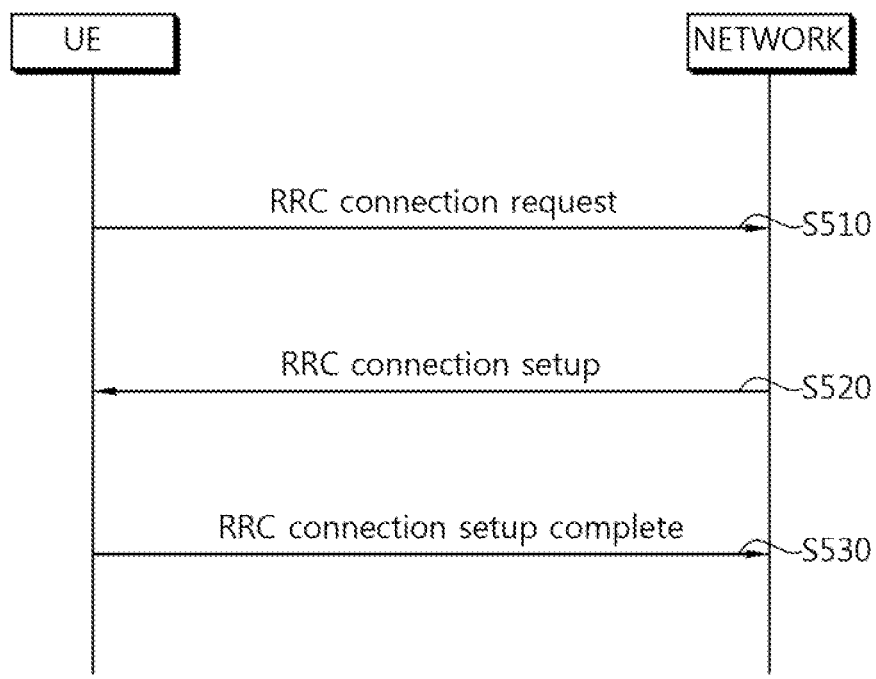
FIG. 4 is a flowchart showing an RRC connection establishment procedure.

FIG. 4 is a flowchart showing an RRC connection establishment procedure.

A UE sends to a network an RRC connection request message for requesting an RRC connection (step S510). The network sends an RRC connection setup message in response to the RRC connection request (step S520). After receiving the RRC connection setup message, the UE enters an RRC connection mode.

The UE sends to the network an RRC connection setup complete message used to confirm successful completion of the RRC connection establishment (step S530).

RRC connection reestablishment is also performed like the RRC connection setup. The RRC connection reestablishment is to reestablish RRC connection and is related to the restart of an SRB1 operation, the reactivation of security, and the configuration of a Primary Cell (PCell). The UE sends an RRC connection reestablishment request message that requests RRC connection reestablishment. In response to the RRC connection reestablishment request, the network sends an RRC connection reestablishment message. In response to the RRC connection reestablishment, the UE sends an RRC connection reestablishment complete message.

Figure 5:
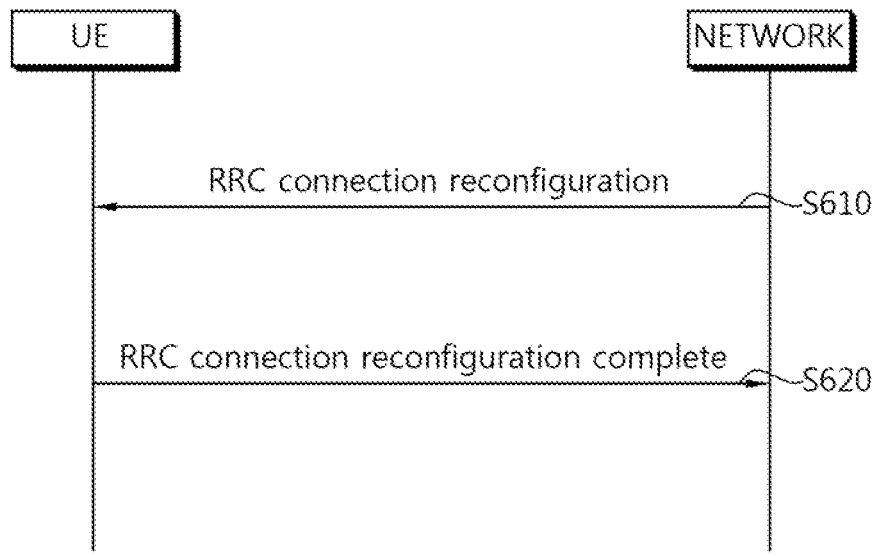
FIG. 5 is a flowchart showing an RRC connection reconfiguration procedure.

FIG. 5 is a flowchart showing an RRC connection reconfiguration procedure. An RRC connection reconfiguration is used to modify an RRC connection. This is used to establish/modify/release an RB, to perform a handover, and to set up/modify/release a measurement.

The network sends an RRC connection reconfiguration message for modifying RRC connection to the UE (S610). In response to the RRC connection reconfiguration message, the UE sends an RRC connection reconfiguration complete message, used to check whether the RRC connection reconfiguration has been successfully completed, to the network (S620).

Figure 6:
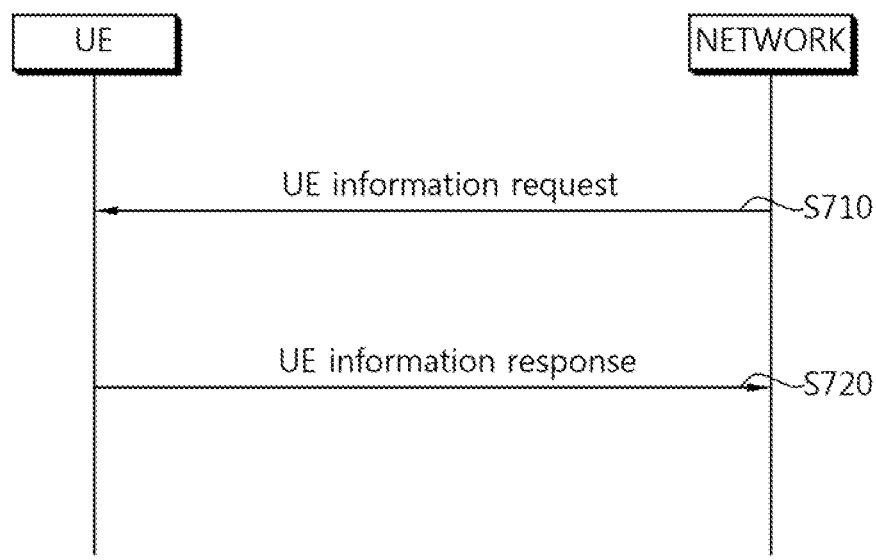
FIG. 6 is a flowchart illustrating a process of reporting UE information.

FIG. 6 is a flowchart illustrating a process of reporting UE information.

The network sends a UE information request message for obtaining UE information to the UE (S710). The UE information request message includes a field indicating whether the UE reports information about a random access process and/or a radio link failure or not. The UE information request message includes a field indicating whether the UE reports logged measurement or not.

The UE sends a UE information response message, including information requested by the UE information request, to the network (S720).

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 7:
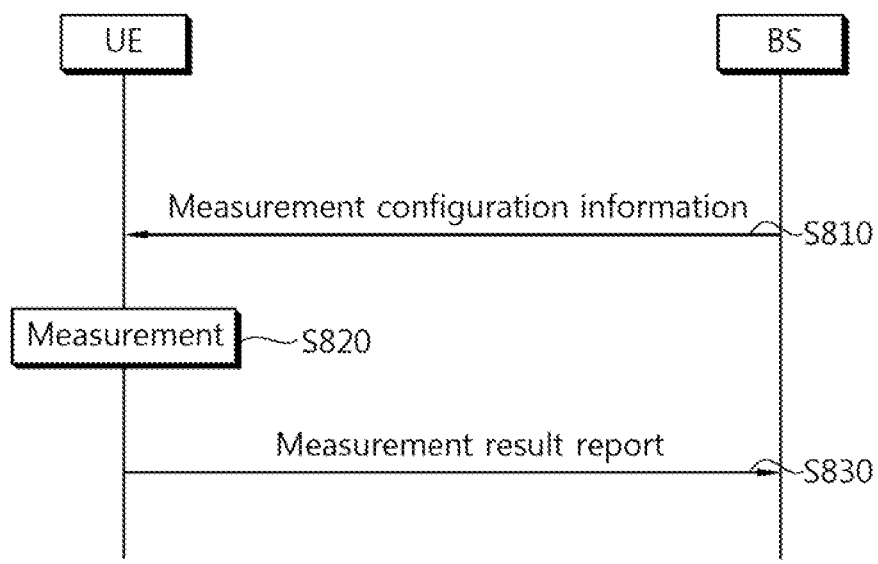
FIG. 7 is a flowchart illustrating the existing method of performing measurement.

FIG. 7 is a flowchart illustrating the existing method of performing measurement.

A UE receives measurement configuration information from a BS (step S810). A message including the measurement configuration information is referred to as a measurement configuration message. The UE performs measurement based on the measurement configuration information (step S820). If a measurement result satisfies a reporting condition included in the measurement configuration information, the UE reports the measurement result to the BS (step S830). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

UE has a measurement object list, a measurement report configuration list, and a measurement ID list in order perform a measurement procedure.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 1

| EVENT | REPORT CONDITION |
|---|---|
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |

TABLE 1-continued

| EVENT | REPORT CONDITION |
|---|---|
| Event B2 | Serving becomes worse than threshold1 and inter RAT neighbour becomes better than threshold2 |

If the measurement result of the UE satisfies the determined event, the UE transmits a measurement report message to the BS.

Figure 8:
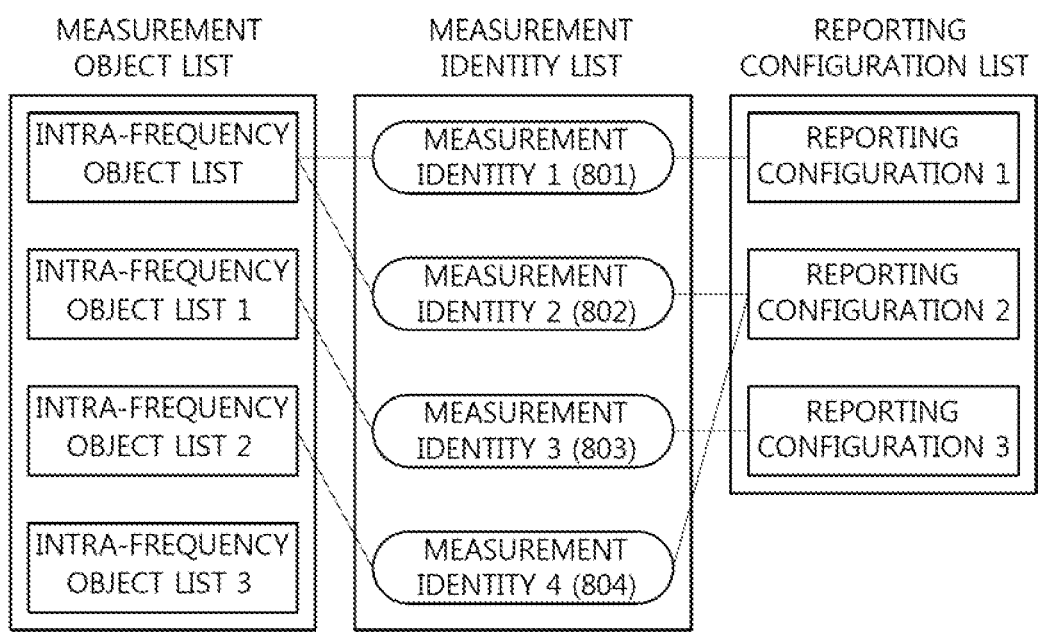
FIG. 8 shows an example of a measurement configuration assigned to a UE.

FIG. 8 shows an example of a measurement configuration assigned to a UE.

First, a measurement identity1 801 associates an intra-frequency measurement object with a reporting configuration 1. The UE performs intra-frequency measurement. The reporting configuration 1 is used to determine a reporting type and a criterion for reporting a measurement result.

A measurement identity2 802 is associated with the intra-frequency measurement object similarly to the measurement identifier1 801, and associates the intra-frequency measurement object with a reporting configuration 2. The UE performs intra-frequency measurement. The reporting configuration 2 is used to determine a reporting format and a criterion for reporting a measurement result.

By using the measurement identity1 801 and the measurement identity2 802, the UE transmits a measurement result even if the measurement result on the intra-frequency measurement object satisfies any one of the reporting configuration 1 and the reporting configuration 2.

A measurement identity3 803 associates an inter-frequency measurement object 1 with a reporting configuration 3. When a measurement result on the inter-frequency measurement object 1 satisfies a reporting criterion included in the reporting configuration 1, the UE reports the measurement result.

measurement identity4 804 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 9:
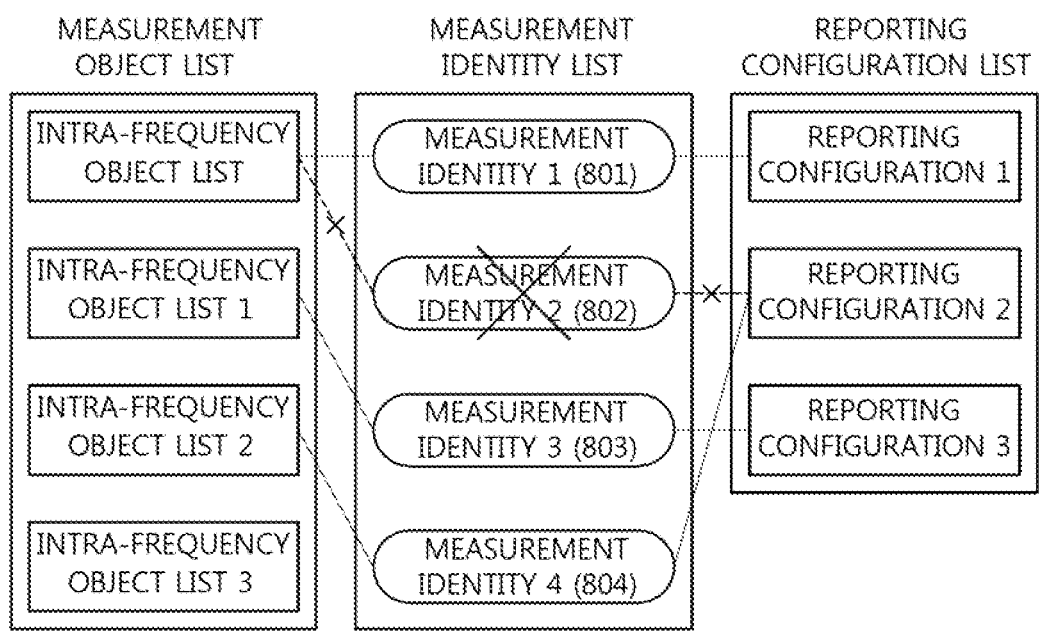
FIG. 9 shows an example of deleting a measurement identity.

FIG. 9 shows an example of deleting a measurement identity. When a measurement identity2 802 is deleted, measurement on a measurement object associated with the measurement identity2 802 is suspended, and a measurement report is not transmitted. A reporting configuration or a measurement object associated with the deleted measurement identity may not be modified.

Figure 10:
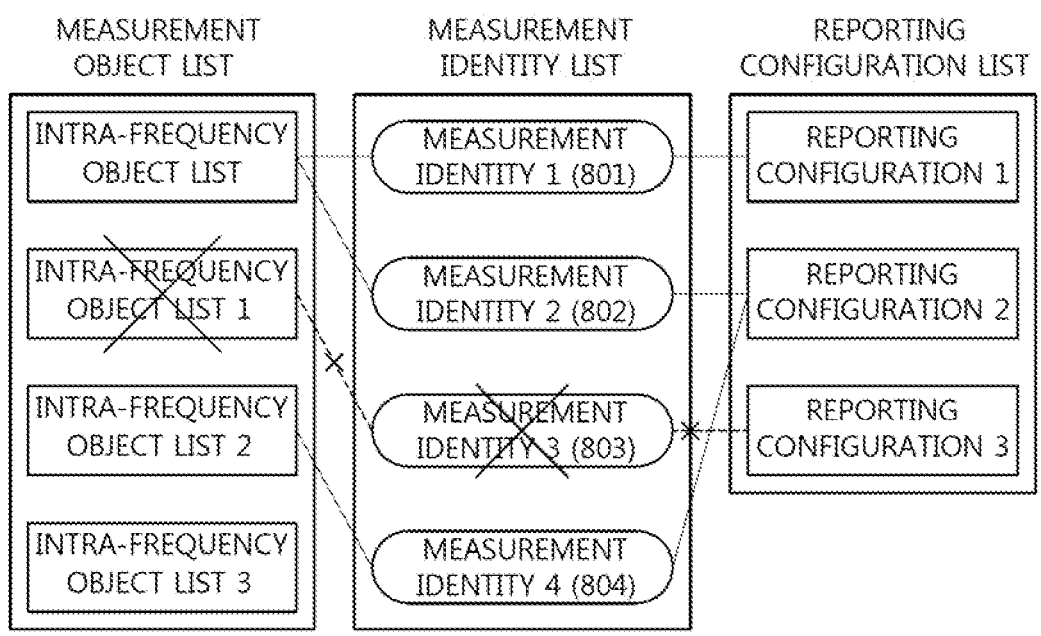
FIG. 10 shows an example of deleting a measurement object.

FIG. 10 shows an example of deleting a measurement object. When an inter-frequency measurement object 1 is deleted, a UE also deletes an associated measurement identifier3 803. Measurement on the inter-frequency measurement object 1 is suspended, and a measurement report is not transmitted. However, a reporting configuration associated with the deleted inter-frequency measurement object 1 may not be modified or deleted.

When the reporting configuration is deleted, the UE also deletes an associated measurement identifier. The UE suspends measurement on an associated measurement object according to the associated measurement identifier. Measurement on the measurement object and measurement reporting are suspended. However, a measurement object associated with the deleted reporting configuration may not be modified or deleted.

After receiving a measurement configuration, UE performs measurement for a measurement object associated with a measurement ID. In relation to a result of the measurement, the UE evaluates whether the result satisfies a measurement report condition based on a report configuration included in the measurement configuration. If a report criterion included in the report configuration is satisfied, the UE sends a measurement report message, including measurement report information, to a network.

The measurement report message includes the following pieces of information.

Measurement ID: a measurement ID associated with a report configuration that satisfies a report criterion. A network can know that a measurement report received from UE has been transmitted according to what criterion by using the measurement ID.

The quality value of a measured serving cell: the quality value of a serving cell that has been measured by UE.

Information about a measured neighboring cell: the measurement ID of a neighboring cell that has been measured by UE. The information includes the ID of a neighboring cell and the quality value of the neighboring cell. The ID of the neighboring cell is a physical cell identifier of the neighboring cell that satisfies a report criterion. The quality value of the neighboring cell is the quality value of the neighboring cell that satisfies the report criterion.

A Minimization of Driving Test (MDT) is described below.

The MDT is a test in which service providers perform tests using terminals for coverage optimization instead of using vehicles. Coverage is changed depending on the position of a base station, the deployment of surrounding buildings, and use environments of users. Accordingly, a service provider needs to perform a driving test periodically, and thus lots of costs and resources are consumed. The MDT is a test in which a service provider measures coverage using terminals.

The MDT may be divided into a logged MDT and an immediate MDT. In accordance with the logged MDT, a terminal performs MDT measurement and then transfers logged measurement to a network at a specific point of time. In accordance with the immediate MDT, a terminal performs MDT measurement and transfers the measurement to a network when a report condition is satisfied. In the logged MDT, MDT measurement is performed in RRC idle mode, but in the immediate MDT, MDT measurement is performed in RRC connected mode.

Figure 11:
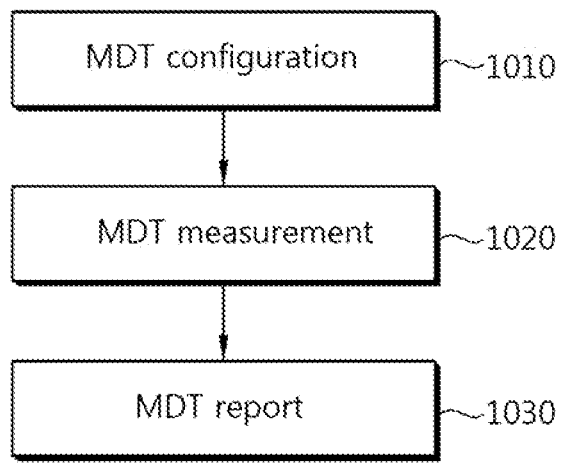
FIG. 11 shows a process of performing the MDT.

FIG. 11 shows a process of performing the MDT.

The MDT is performed in order of an MDT configuration 1010, MDT measurement 1020, and an MDT report 1030.

The MDT configuration may be transmitted from a network to UE through a logged measurement configuration message, that is, an RRC message. The UE may receive the MDT configuration in RRC connected mode. Although RRC mode switches to RRC idle mode, the MDT configuration remains intact, and thus an MDT measurement result is also maintained.

The MDT configuration may include at least one of a logging interval, a reference time, and an area configuration. The logging interval indicates an interval where a result of measurement is stored. The reference time is used to inform a reference time when UE sends logged measurement. The area configuration refers to an area that is requested for UE to perform logging in the area.

UE performs MDT measurement based on the MDT configuration. For example, UE performs MDT measurement at a logging interval within the MDT configuration.

Reference Signal Received Power (RSRP), Reference Signal Received Quality (RSRQ), Received Signal Code Power (RSCP), and Ec/No which are well known to those skilled in the art may be used as a measurement value.

UE sends logged measurement to a network in RRC connected mode. In logged MDT, UE logs on to measurement in RRC idle mode. Furthermore, the UE that has entered RRC connected mode sends logged measurement to the network again.

The logged measurement may include at least one of a result of measurement for an available serving cell, a result of measurement for an available neighbour cell, and time information and location information.

For an MDT report, the UE information report process of FIG. 6 may be used. A network sends an information request, including a field indicating a report on logged measurement, to UE. The UE sends an information response, including the logged measurement, to the network.

A service provider may synthesize MDT measurements received from several UEs, make a coverage map indicating whether service is possible over the entire area where the service provider provides the service and a distribution of the quality of the service, and use the coverage map in the operation and optimization of a network. For example, when a report on the coverage problem of a specific area is received from UE, a service provider may extend the coverage of the corresponding area cell by increasing the transmit power of a BS which provides service to the corresponding area.

For the MDT measurement of UE in RRC idle mode, a network may transfer an MDT measurement configuration to the UE when the UE is in RRC connected mode.

An MDT measurement configuration optimized for one cell may differ from an MDT measurement configuration optimized for the other cell. If UE in RRC idle mode does not set up RRC connection with a new cell and continues to remain in RRC idle mode, a network cannot transfer an MDT measurement configuration optimized for the new cell to the UE.

Accordingly, there is a need for a method in which UE in RRC idle mode is able to perform MDT measurement according to a measurement configuration optimized for a serving cell.

In order for UE in RRC idle mode to receive an MDT measurement configuration, a broadcast message may be used. The broadcast message is information that is received by all UEs within a cell. Since all the UEs do not need to perform MDT measurement, a method regarding how UE will apply a broadcasted MDT measurement configuration selectively is also required.

Furthermore, assuming that only some of UEs within a network agree with participation in MDT measurement, there is a possibility that a network may use the agreed UEs for the MDT measurement excessively. Accordingly, there is also a need for a method in which UE may participate in MDT measurement in probability.

In accordance with an embodiment of the present invention, UE receives a measurement configuration for MDT measurement and a parameter that will be used to determine whether the measurement configuration will be applied or not from a network. The UE determines whether or not to apply the measurement configuration based on the received parameter.

The parameter may be broadcast information.

Figure 12:
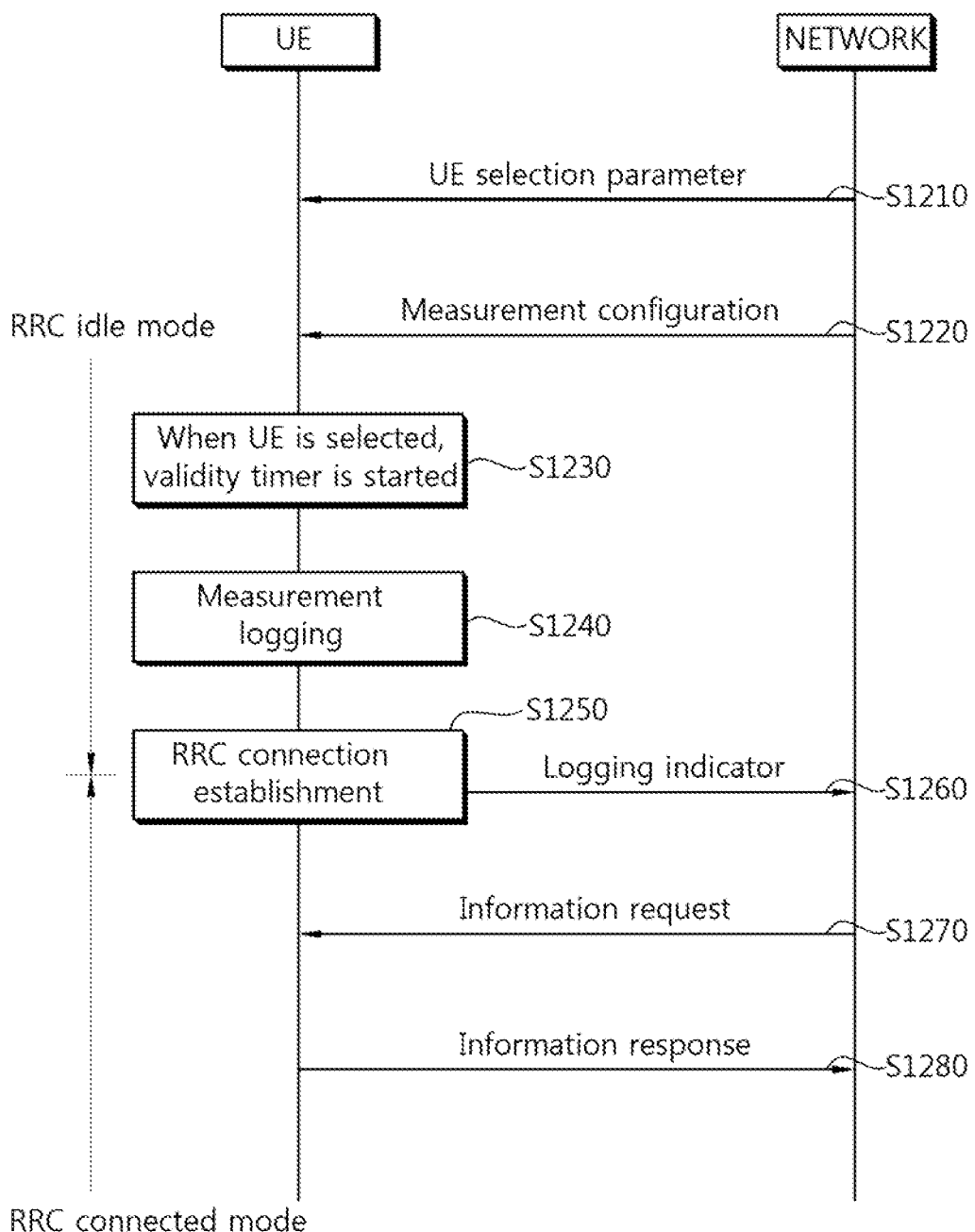
FIG. 12 is a flowchart illustrating a method of performing measurement according to an embodiment of the present invention.

FIG. 12 is a flowchart illustrating a method of performing measurement according to an embodiment of the present invention.

UE in RRC idle mode receives a UE selection parameter from a network (S1210). The UE selection parameter is information indicating whether UE will apply a measurement configuration or not. The UE selection parameter may be broadcast information that is received by all UEs within a cell.

The UE receives a measurement configuration from the network (S1220). The measurement configuration may be an MDT configuration for MDT measurement. The MDT configuration may include at least one of a logging interval, a reference time, and an area configuration. The measurement configuration may be broadcast information that is received by all UEs within a cell. The measurement configuration may be transmitted along with or separately from the UE selection parameter.

The measurement configuration may include the value of a validity timer. The validity timer indicates the lifetime of the measurement configuration. If the measurement configuration is an MDT configuration, the value of the validity timer may be said to be logging duration.

The UE determines whether or not to apply the measurement configuration based on the UE selection parameter. If the UE determines to apply the measurement configuration based on the UE selection parameter, the validity timer is started (S1230).

While the validity timer operates, the UE in RRC idle mode logs measurement based on the measurement configuration (S1240).

If the UE selection parameter and/or the measurement configuration are updated and the UE determines to apply the measurement configuration, the measurement configuration is updated into a new measurement configuration and the validity timer may be restarted. Furthermore, the logged measurement may be discarded according to the previously configured measurement configuration.

When the validity timer expires, the UE discards the measurement configuration. This means that the UE removes the measurement configuration and stops measurement. When the validity timer expires, not only the measurement configuration, but also the logged measurement may be discarded. Alternatively, when the validity timer expires, the measurement configuration may be discarded, but the logged measurement may remain intact. The logged measurement may be maintained for a specific time after the validity timer expires.

The UE establishes or reestablishes RRC connection with a BS and enters RRC connected mode (S1250). If the validity timer expires before entering RRC connected mode, the UE discards the measurement configuration and maintains the logged measurement. The UE removes the measurement configuration and no longer performs measurement. Alternatively, when the UE enters RRC connected mode, the validity timer may be operating.

When the UE switches from RRC idle mode to RRC connected mode, the UE sends a logging indicator to the network (S1260). The logging indicator may be an indicator that indicates the availability of logged measurement. The UE performs measurement in RRC idle mode and, when entering RRC connected mode, informs the network whether there is logged measurement.

When the UE informs the network of the availability of logged measurement, the UE may inform the network whether it is the last occasion that an MDT log may be reported. When the validity timer expires and thus the MDT configuration is discarded, but a new MDT configuration is not updated, the UE may inform the network that there is a managed MDT log and the MDT log will be soon discarded. This may be informed using logging indicators of 2 bits as in the table below.

TABLE 2

| BITS | CONTENTS |
|------|----------|
| 00 | No logged measurement |
| 01 | Logged measurement exists, but it is not the last occasion |
| 11 | Logged measurement exists and it is the last occasion |
| 11 | Reserved |

The above bit representations are only illustrative, but not limited thereto.

The UE may send the logging indicator to the network when RRC connection is established, the RRC connection is reestablished, or the RRC connection is reconfigured. For example, when the RRC connection process of FIG. 4 is performed, the logging indicator may be included in an RRC connection setup complete message. When the RRC connection reconfiguration process of FIG. 5 is performed, the logging indicator may be included in the RRC connection reconfiguration complete message.

The network which has known that there is logged measurement based on the logging indicator sends an information request, requesting a report on the logged measurement, to the UE (S1270). The UE sends an information response, including the logged measurement, to the network (S1280).

The following table shows the operation of the validity timer.

TABLE 3

| | WHEN | UE OPERATION |
|---|------|--------------|
| Timer start | When the measurement configuration and/or the UE selection parameter are receive or the measurement configuration is applied | Start measurement using the measurement configuration |
| Timer stop | When a UE buffer is full, the measurement configuration is invalid, or RRC connected mode is entered | Measurement is stopped |
| Timer expire | | The measurement configuration is discarded, measurement is stopped, and logged measurement is maintained for a specific time |

The UE selection parameter is described in detail below.

UE uses the UE selection parameter in order to determine whether it will participate in requested measurement or not.

The UE selection parameter may include a UE identifier or a UE identifier.

The UE selection parameter may include a threshold. For example, UE may generate a random number and compare the random number with the threshold. If the random number is greater than the threshold, the UE applies a measurement configuration. The UE selection parameter may include information for generating the random number.

UE may determine whether or not to apply a measurement configuration by combining the UE selection parameter and a predefined parameter. The predefined parameter may include at least one of negotiations with a BS regarding whether UE will participate in measurement (this may correspond to the case where the UE expresses an intention to voluntarily participate in measurement to the BS), whether MDT is supported, and information previously received from a network.

The UE selection parameter may indicate a UE group. UEs within a cell are classified into one or more groups. The groups may perform measurement in exclusive time/frequencies periodically.

As the UE moves, a cell that sends a UE selection parameter and a measurement configuration may be changed. The validity of a UE selection parameter according to a change of a cell is described below.

Figure 13:
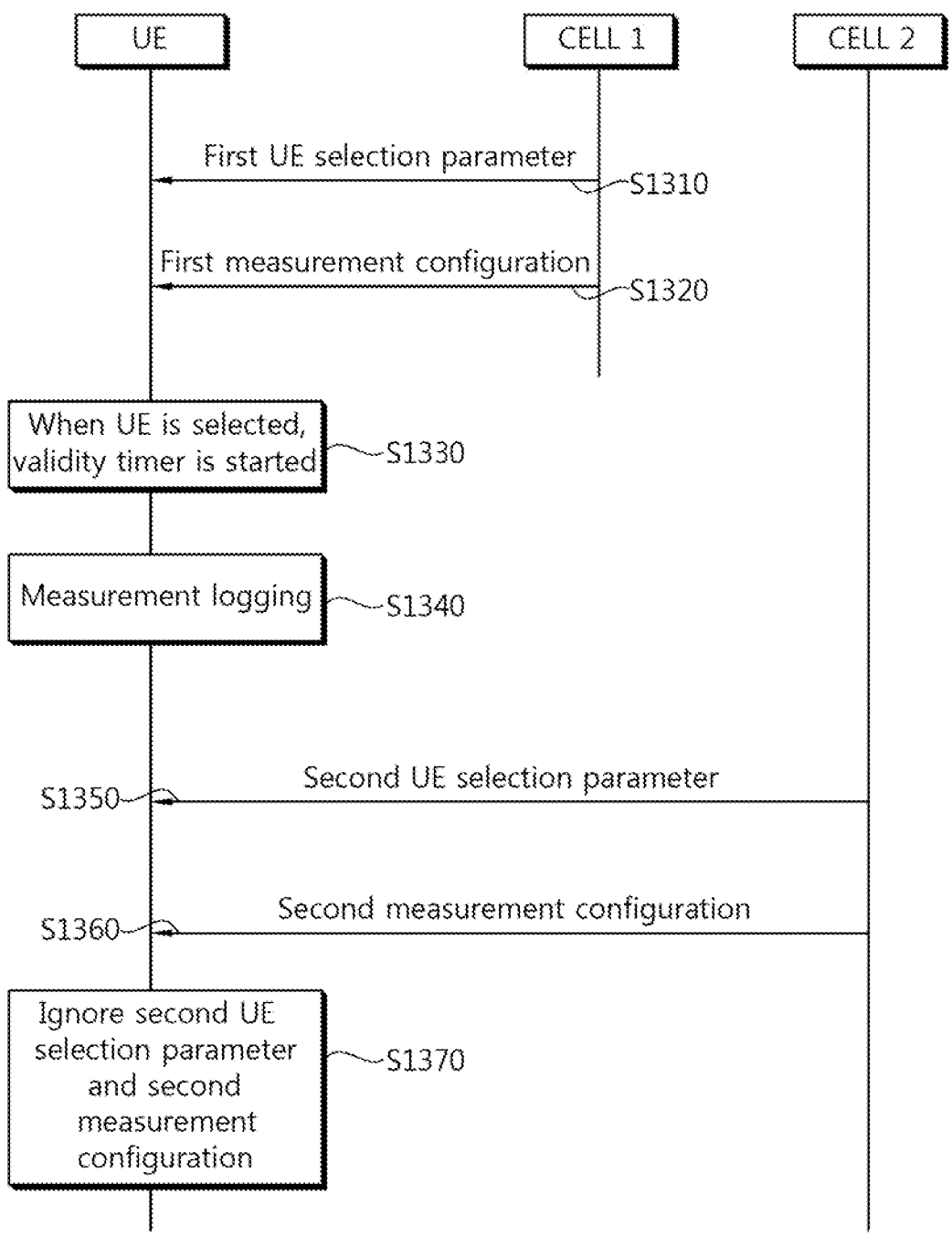
FIG. 13 is a flowchart illustrating a method of performing measurement according to an embodiment of the present invention.

FIG. 13 is a flowchart illustrating a method of performing measurement according to an embodiment of the present invention.

UE in RRC idle mode receives a first UE selection parameter from a cell 1 (S1310). The UE receives a first measurement configuration from the cell 1 (S1320). If the UE selects to apply the measurement configuration based on the UE selection parameter, the validity timer is started (S1330). While the validity timer operates, the UE in RRC idle mode performs logging measurement based on the measurement configuration (S1340).

As the UE moves, the UE receives a second UE selection parameter from a cell 2 (S1350). The UE receives a second measurement configuration from the cell 2 (S1360). If there is a measurement configuration already applied by the UE, the UE ignores the second UE selection parameter and/or the second measurement configuration (S1370).

When the UE performs logging measurement using a valid measurement configuration, a measurement configuration received from other cell is not applied.

The UE has the first measurement configuration, but may not have the first UE selection parameter. The UE determines whether or not to apply the measurement configuration based on the second UE selection parameter. If the UE selects to apply the measurement configuration, the UE may apply the first measurement configuration that has been previously applied, not the second measurement configuration.

The UE has the first UE selection parameter, but may not have the first measurement configuration. The UE determines whether or not to apply the measurement configuration based on the second UE selection parameter. If the UE selects to apply the measurement configuration, the UE may apply the second measurement configuration.

As another embodiment, the UE selection parameter is valid until the UE receives a new UE selection parameter from a new cell. In the above example, when the second UE selection parameter is received from the cell 2, the UE may determine whether or not to apply the measurement configuration based on the second UE selection parameter.

A BS may send an indicator, informing whether the UE selection parameter will be ignored or not, to the UE.

UE may store a plurality of measurement configurations. When UE sends a result of logged measurement according to a specific measurement configuration to a BS, the UE may inform the BS of information about the corresponding measurement configuration. The BS may determine that the logged measurement transmitted by the UE is based on what measurement configuration on the basis of information about the measurement configuration and the result of the logged measurement which have been received from the UE.

A network may instruct specific UE of each cell to perform the execution of measurement and a report which are necessary for a specific number of UEs statistically. Whether the UE will perform the execution of measurement and the report or not is determined by a statistics or probability method. Thus, the case where specific UE performs measurement repeatedly or excessively can be prevented.

Furthermore, since each cell can instruct a measurement configuration suitable for the cell to UE, UE in RRC idle mode can perform measurement a unique measurement configuration that is broadcasted by a new cell. A measurement configuration and measurement report which are optimized for each cell are possible.

A method of designating RRC mode to which a measurement configuration is applied is described below.

In general, the RRC configuration of UE in RRC connected mode UE is much complicated than the RRC configuration of UE in RRC idle mode. This because a difference between the operations of UEs which are possible in RRC mode is great. Accordingly, it was not necessary to configure the setting of RRC connected mode and the setting of RRC idle mode at the same time using the same message or the same RRC configuration structure. As a result, a message that changes the RRC configuration of UE could have a 1:1 relationship with specific RRC mode, that is, a configuration change object. For example, an RRC connection reconfiguration message is a message for changing the RRC configuration of UE in RRC connected mode. An RRC connection release message switches the UE in RRC connected mode to UE in RRC idle mode and changes an RRC configuration related to cell reselection which is performed in RRC idle mode.

MDT measurement is measurement in RRC idle mode. For the MDT measurement, a network may need to utilize a smooth measurement configuration structure in RRC connected mode. Alternatively, UE may need to use the same measurement configuration irrespective of RRC connected mode and RRC idle mode.

In accordance with another embodiment of the present invention, a network provides UE with RRC mode indicator indicating RRC mode to which an RRC configuration has to be applied. The UE applies the RRC configuration in the instructed RRC mode.

The RRC configuration may include the measurement configuration of UE.

The RRC configuration may be a measurement configuration for MDT.

The RRC mode indicator may be represented by any one of IDLE, CONNECTED, and BOTH. 'IDLE' indicates RRC idle mode, 'CONNECTED' indicates RRC connected mode, and 'BOTH' indicates both RRC idle mode and RRC connected mode. An RRC configuration associated with RRC mode indicator may be part of or the entire RRC configuration including RRC mode indicator.

An RRC mode indicator may be included in an RRC configuration message. For example, if an RRC configuration is a measurement configuration, RRC mode indicator may be included in a measurement configuration message.

If RRC mode indicator is associated with part of an RRC configuration, RRC mode indicator may be included in an actually associated part of the RRC configuration. For example, it is assumed that RRC mode is associated with a specific frequency of a measurement configuration. A measurement configuration may be configured so that RRC mode indicator is associated with a measurement object or a measurement ID.

For example, 'MeasIdToAddModList' is an Information Element (IE) used to add or modify a measurement object in 3GPP TS 36.331. An RRC mode indicator may be added to MeasIdToAddModList as follows.

```
MeasIdToAddModList__New ::= SEQUENCE (SIZE
(1..maxMeasId)) OF MeasIdToAddMod__New
MeasIdToAddMod__New ::= SEQUENCE {
    measId MeasId,
    measObjectId MeasObjectId,
```

-continued

```
reportConfigId ReportConfigId,
RRCState ENUMERATED {IDLE, CONNECTED, BOTH},
}
```

If RRC mode indicator indicates 'IDLE', UE applies an RRC configuration to only RRC idle mode. It may correspond to that the RRC configuration is valid only in RRC idle mode.

If RRC mode indicator indicates 'CONNECTED', UE applies an RRC configuration to only RRC connected mode. It may correspond to that the RRC configuration is valid only in RRC connected mode.

If RRC mode indicator indicates 'BOTH', UE applies an RRC configuration to RRC connected mode and RRC idle mode. It may correspond to that the RRC configuration is valid in RRC connected mode and in RRC idle mode.

When an RRC configuration in which RRC mode indicator indicates is received, UE may maintain the RRC configuration although RRC mode is changed. If RRC mode indicator indicates 'IDLE' or 'BOTH', UE may maintain an associated RRC configuration although RRC connected mode is switched to RRC idle mode. The UE may also maintain results (e.g., a result of logged measurement) generated by the RRC configuration.

When an RRC configuration in which RRC mode indicator indicates 'IDLE' or 'BOTH' is received, UE maintains results generated by the RRC configuration although RRC mode is changed. When RRC mode indicator indicates 'IDLE' or 'BOTH', UE discards the RRC configuration when RRC connected mode switches to RRC idle mode, but maintains the results generated by the RRC configuration.

When RRC mode indicator indicates 'BOTH', UE in RRC idle mode may generate results by applying a corresponding RRC configuration. Next, after the UE switches to RRC connected mode, the UE may report RRC mode indicator, the RRC configuration and/or the results to a BS. The BS which has known that the UE applies the RRC configuration indicated by 'BOTH' may configure a similar or identical RRC configuration for the UE so that the corresponding RRC configuration remains intact.

The case where an RRC configuration is a measurement configuration and results measurement results are described below as an example.

Figure 14:
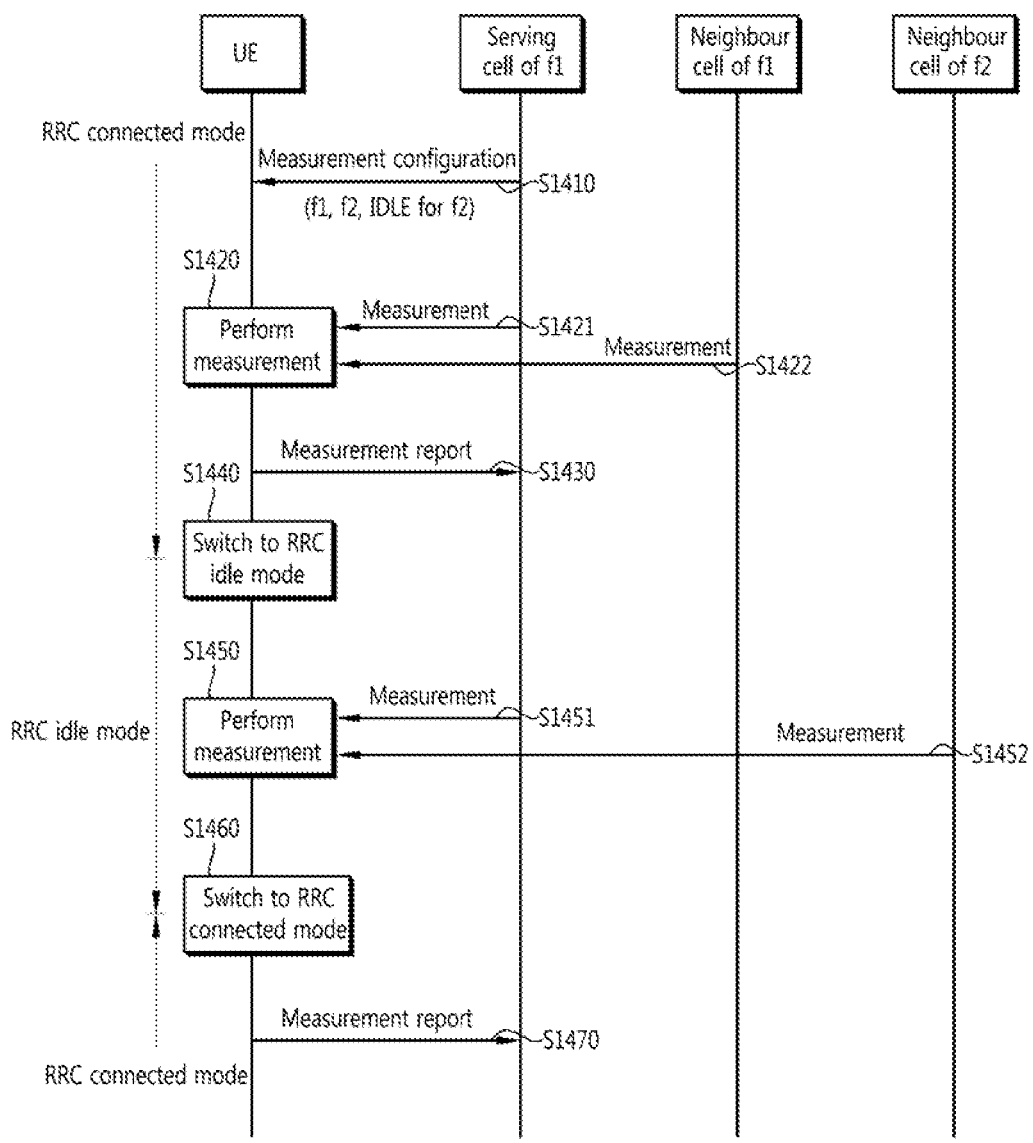
FIG. 14 is a flowchart illustrating a method of performing measurement according to another embodiment of the present invention.

FIG. 14 is a flowchart illustrating a method of performing measurement according to another embodiment of the present invention.

it is assumed that there are a serving cell of a frequency f1 of, a neighboring cell of a frequency f1, and a neighboring cell of a frequency f2.

UE receives a measurement configuration from the serving cell (S1410). The measurement configuration includes a measurement configuration regarding the frequency f1 and the frequency f1. The measurement configuration further includes RRC mode indicator indicating that the measurement configuration of the frequency f2 is applied to RRC idle mode.

The UE performs measurement for the cells of the frequency f1 in RRC connected mode (S1420). That is, the UE measures the serving cell of the frequency f1 (S1421) and measures the neighboring cell of the frequency f1 (S1422).

If a measurement report condition regarding the measurement configuration of the frequency f1 is satisfied, the UE reports a result of the measurement (S1430).

Next, the UE switches to RRC idle mode (S1440). When the UE switches to RRC idle mode, the UE deletes the measurement configuration of the frequency f1, but maintains the measurement configuration of the frequency f2.

The UE performs measurement for the cells of the frequency f2 in RRC idle mode (S1450). The UE measures the serving cell of the frequency f1 (S1451) and measures the neighboring cell of the frequency f2 (S1452).

The UE switches to RRC connected mode (S1460). Although the UE switches to RRC connected mode, the UE maintains a result of the measurement according to the measurement configuration of the frequency f2.

If a measurement report condition regarding the measurement configuration of the frequency f2 is satisfied, the UE reports a result of the measurement, performed according to the measurement configuration of the frequency f2, to the BS (S1470). Alternatively, the UE may report a result of the measurement, performed according to the measurement configuration of the frequency f2, to a BS at the request of the BS. Next, when the UE switches to RRC idle mode, the UE maintains a result of the measurement for the frequency f2 that has not been reported.

Figure 15:
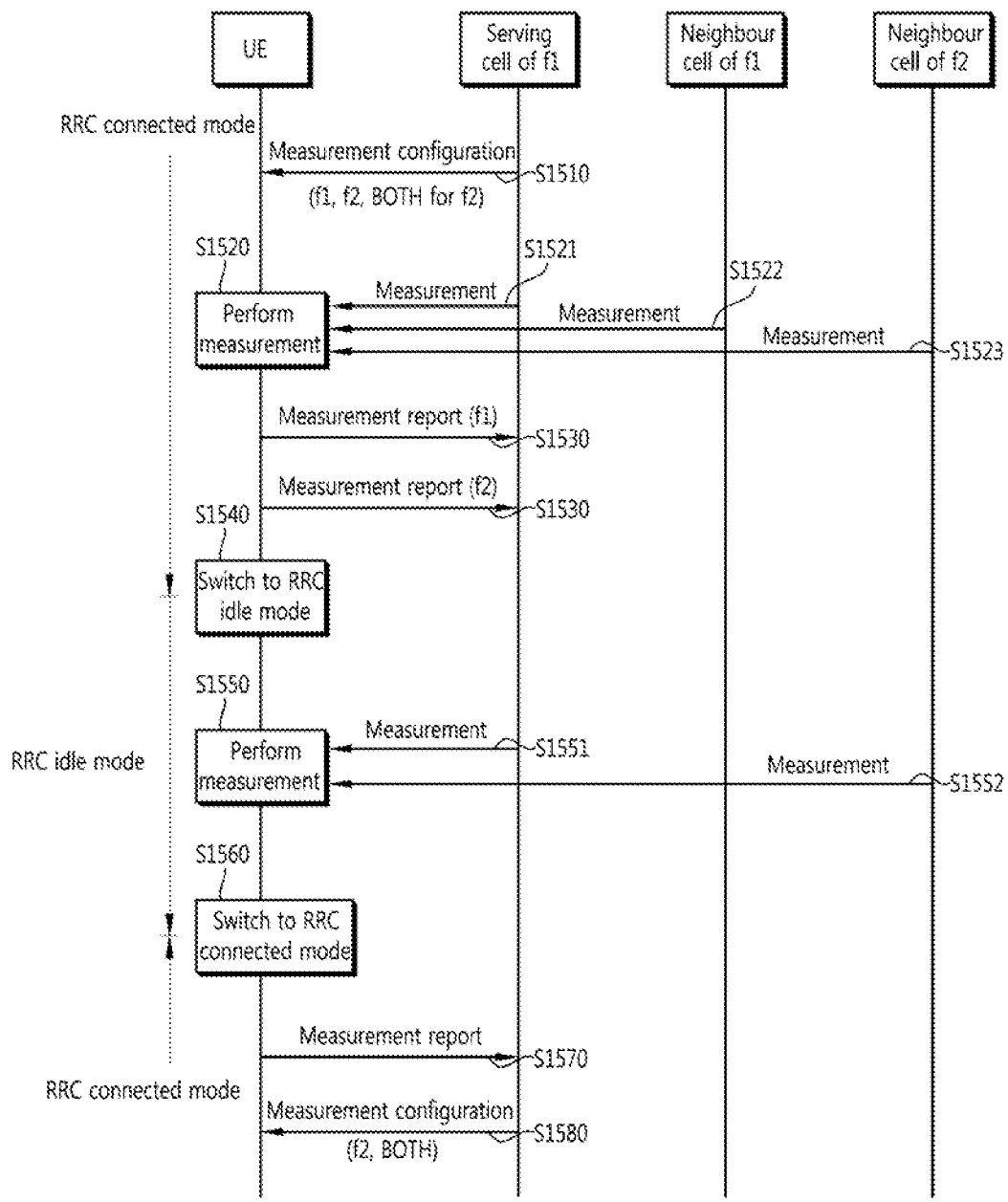
FIG. 15 is a flowchart illustrating a method of performing measurement according to yet another embodiment of the present invention.

FIG. 15 is a flowchart illustrating a method of performing measurement according to yet another embodiment of the present invention.

UE receives a measurement configuration from a serving cell (S1510). The measurement configuration includes a frequency f1 and a measurement configuration regarding the frequency f1. The measurement configuration further includes RRC mode indicator indicating that the measurement configuration of a frequency f2 is applied to RRC idle mode and RRC connected mode.

The UE performs measurement for the cells of the frequencies f2 and f2 in RRC connected mode (S1520). That is, the UE measures the serving cell of the frequency f1 (S1521), measures the neighbour cell of the frequency f1 (S1522), and measures the neighboring cell of the frequency f2 (S1523).

If a measurement report condition regarding the measurement configuration of the frequency f1 is satisfied, the UE reports a result of the measurement (S1530).

If a measurement report condition regarding the measurement configuration of the frequency f2 is satisfied, the UE reports a result of the measurement (S1535).

Next, the UE switches to RRC idle mode (S1540). When the UE switches to RRC idle mode, the UE deletes the measurement configuration of the frequency f1, but maintains the measurement configuration of the frequency f2.

The UE performs measurement for the cells of the frequency f2 in RRC idle mode (S1550). The UE measures the serving cell of the frequency f1 (S1551) and measures the neighboring cell of the frequency f2 (S1552).

The UE switches to RRC connected mode (S1560). Although the UE switches to RRC connected mode, the UE maintains a result of the measurement according to the measurement configuration of the frequency f2.

If the measurement report condition regarding the measurement configuration of the frequency f2 is satisfied, the UE reports a result of the measurement, performed according to the measurement configuration of the frequency f2, to the BS (S1570). Alternatively, the UE may report a result of the measurement, performed according to the measurement configuration of the frequency f2, to a BS at the request of the BS. The UE may inform the BS of RRC mode indicator that has been designated as 'BOTH'. Accordingly, the BS can know that a result of the measurement of the frequency f2 is a result of the measurement in RRC idle mode and RRC connected mode. Each of entries within a result of the measurement transmitted by the UE may include an indicator indicating that measurement has been performed in which RRC mode.

The serving cell which has received RRC mode indicator designated as 'BOTH' from the UE may intentionally avoid the reconfiguration of the measurement configuration regarding the frequency f2 so that the measurement configuration regarding the frequency f2 of the UE remains intact or may send RRC mode indicator indicating 'BOTH', together with a measurement configuration having the same configuration as the UE, to the UE (S1580).

When the UE switches to RRC idle mode, the UE may maintain a result of the measurement for the frequency f2 that has not been reported.

In accordance with the proposed invention, a network may designate RRC mode to which a corresponding RRC configuration will be applied when configuring or reconfiguring the RRC configuration of UE.

If the proposed invention is applied to the measurement configuration of UE, a network may designate whether UE has to measure which frequency in RRC idle mode particularly by utilizing the structure of a measurement configuration used in RRC connected mode. Additional measurement configuration signaling for changing a measurement configuration in RRC idle mode from a viewpoint of UE can be reduced, and a smooth measurement configuration in RRC connected mode can also be applied to RRC idle mode.

A configuration may be performed so that UE measures a specific frequency both in RRC connected mode and RRC idle mode.

When reporting a result of measurement for an RRC configuration both in RRC idle mode and RRC connected mode, a BS may be informed of an RRC mode indicator. The BS may guarantee the continuity of the RRC configuration. The continuity of the RRC configuration may be usefully used for a specific purpose, such as MDT measurement.

Figure 16:
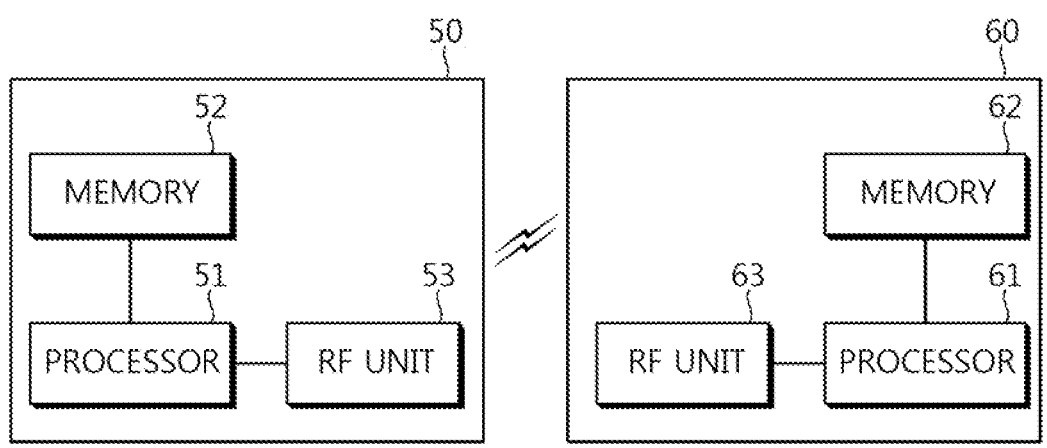
FIG. 16 is a block diagram of a wireless communication system in which the embodiments of the present invention are implemented.

FIG. 16 is a block diagram of a wireless communication system in which the embodiments of the present invention are implemented.

A BS 50 includes a processor 51, memory 52, and a Radio Frequency (RF) unit 53. The memory 52 is connected to the processor 51, and it stores various pieces of information for driving the processor 51. The RF unit 53 is connected to the processor 51, and it transmits and/or receives radio signals. The processor 51 embodies the proposed functions, processes and/or methods. In the embodiments of FIGS. 12 to 15, the operation of the BS 50 may be embodied by the processor 51.

UE 60 includes a processor 61, memory 62, and an RF unit 63. The memory 62 is connected to the processor 61, and it stores various pieces of information for driving the processor 61. The RF unit 63 is connected to the processor 61, and it transmits and/or receives radio signals. The processor 61 embodies the proposed functions, processes and/or methods. In the embodiments of FIGS. 12 to 15, the operation of the UE 60 may be embodied by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing radio signals. When the above-described embodiment is implemented in software, the above-described scheme may be implemented using a module (process or function) configured to perform the above function. The module may be stored in the memory and executed by the processor. The memory may be placed inside or outside the processor and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method of performing logged measurement in a wireless communication system, the method comprising:
receiving, by a user equipment (UE), a measurement configuration from a Base Station (BS),
wherein the measurement configuration is a Minimization of Driving Tests (MDT) configuration for MDT measurement;
receiving, by the UE, a UE selection parameter from the BS,
wherein the measurement configuration is transmitted along with the UE selection parameter via a Radio Resource Control (RRC) message, and
wherein the UE selection parameter comprises an identifier of a UE group to which the measurement configuration will be applied;
determining, by the UE, whether or not to apply the measurement configuration by combining the UE selection parameter and a predefined parameter,
wherein the predefined parameter includes at least one of negotiations with the BS regarding a UE's participation in the measurement, a support of a Minimization of Driving Tests (MDT), or previously received information;
starting a validity timer if it is determined to apply the measurement configuration;
logging, by the UE, measurement based on the measurement configuration if it is determined to apply the measurement configuration,
wherein the UE operates in Radio Resource Control (RRC) idle mode, and
wherein, when the validity timer expires, the logged measurement is maintained while the MDT configuration is discarded;
entering, by the UE, into an RRC connected mode; and
while in the RRC connected mode, sending, by the UE to the BS, a logging indicator that indicates an availability of the logged measurement,
wherein the logging indicator is included in at least a RRC connection setup complete message or a RRC connection reconfiguration complete message, and
wherein the logging indicator is represented in a bitmap format having two bits such that the logging indicator further indicates an occasion of the logged measurement.

2. The method of claim 1, further comprising:
receiving, by the UE from the BS, an information request, the information request requesting the logged measurement; and
in response to the information request, sending, by the UE to the BS, the logged measurement via an information response.

3. An apparatus for performing logged measurement in a wireless communication system, the apparatus comprising:
a Radio Frequency (RF) unit that transmits and receives radio signals; and a processor connected to the RF unit, wherein the processor is configured to:

receive a measurement configuration from a Base Station (BS), wherein the measurement configuration is a Minimization of Driving Tests (MDT) configuration for MDT measurement;

receive a UE selection parameter from the BS, wherein the measurement configuration is transmitted along with the UE selection parameter via a Radio Resource Control (RRC) message, and wherein the UE selection parameter comprises an identifier of a UE group to which the measurement configuration will be applied;

determine whether or not to apply the measurement configuration by combining the UE selection parameter and a predefined parameter, wherein the predefined parameter includes at least one of negotiations with the BS regarding a UE's participation in the measurement, a support of a Minimization of Driving Tests (MDT), or previously received information;

start a validity timer if it is determined to apply the measurement configuration;

log measurement based on the measurement configuration if it is determined to apply the measurement configuration, wherein the UE operates in Radio Resource Control (RRC) idle mode, and wherein, when the validity timer expires, the logged measurement is maintained while the MDT configuration is discarded;

enter into an RRC connected mode; and while in the RRC connected mode, send a logging indicator to the BS to indicate an availability of the logged measurement, wherein the logging indicator is included in at least a RRC connection setup complete message or a RRC connection reconfiguration complete message, and wherein the logging indicator is represented in a bitmap format having two bits such that the logging indicator further indicates an occasion of the logged measurement.

4. The apparatus of claim 3, wherein the processor is further configured to:

receive, from the BS, an information request, the information request requesting the logged measurement; and in response to the information request, send, to the BS, the logged measurement via an information response.

* * * * *